(12) United States Patent
Smith et al.

(10) Patent No.: US 6,985,308 B1
(45) Date of Patent: Jan. 10, 2006

(54) TELECOMMUNICATIONS OPTICAL PROCESSOR

(75) Inventors: Malcolm C. Smith, Winchester, MA (US); Michael A. Butler, Andover, MA (US); William C. Sweatt, Albuquerque, NM (US)

(73) Assignee: Polychromix Corporation, Woburn, MA (US)

( * ) Notice: Subject to any disclaimer, the term of this patent is extended or adjusted under 35 U.S.C. 154(b) by 6 days.

(21) Appl. No.: 10/446,299

(22) Filed: May 28, 2003

Related U.S. Application Data (60) Provisional application No. 60/383,641, filed on May 28, 2002.

(51) Int. Cl.
  G02B 17/00 (2006.01)
  G02B 26/00 (2006.01)
  G02B 6/28 (2006.01)
  H04J 14/02 (2006.01)

(52) U.S. Cl. .................. 359/732; 359/291; 385/24; 398/88

(58) Field of Classification Search ......... 359/290–292, 359/298, 732; 398/29, 34, 79, 81, 86–88, 398/96; 385/4
See application file for complete search history.

(56) References Cited

U.S. PATENT DOCUMENTS 5,745,271 A   4/1998   Ford et al. .................. 398/87
6,108,471 A * 8/2000   Zhang et al. ................ 385/37
6,275,623 B1  8/2001   Brophy et al. .............. 385/14
6,384,959 B1 * 5/2002   Furlani et al. ............. 359/291

FOREIGN PATENT DOCUMENTS

EP      1126294 A2    8/2001
WO   WO 01/11419 A2   2/2001

OTHER PUBLICATIONS

Andrew Sappey and Pei Huang, Free-Space Diffraction Gratings Allow Denser Channel Spacing, WDM Solutions magazine, Dec., 2001, pp. 39–41.

* cited by examiner

*Primary Examiner*—Scott J. Sugarman
*Assistant Examiner*—William Choi
(74) *Attorney, Agent, or Firm*—Lowried, Lando & Anastasi, LLP (57) ABSTRACT

A demultiplexer for use in a wavelength-division multiplexed optical system including a first positive lens group, a negative lens group, and a second positive lens group in order from a dispersive element and a reflective element. In some embodiments the reflective element is a light modulator, such as an actuatable diffraction grating. In some embodiments the demultiplexer is a part of a dynamic channel equalizer. In embodiments having a light modulator, the modulation may occur during both a first pass and a second pass.

14 Claims, 7 Drawing Sheets

| Comment | Radius | Thickness | Glass |
|---|---|---|---|
| | Infinity | 1000 | |
| | Infinity | −1000 | |
| | Infinity | 32 | |
| COL1 ⎱ 320 | −41.689 | 1.62 | LASFN9 |
| COL2 ⎰ | −23.99 | 0.5000002 | |
| | Infinity | 3 | SF57 |
| | −56.558 | 60 | |
| | − | 0 | |
| FIELD GRATING —332 | Infinity | 0 | MIRROR |
| | − | −48 | |
| ML1 —314 | −78.684 | −2 | SFL57 |
| ML2 —312 | −14.286 | −5.34 | LAF2 |
| | 14.582 | 0 | |
| ML3 —310 | 14.582 | −2 | LAKN14 |
| | Infinity | −44.70471 | |
| | − | 0 | |
| FOLD MIRROR—345 | Infinity | 0 | MIRROR |
| | − | 72.41898 | |
| TL1—316 | Infinity | 3 | LAKL12 |
| | 17.937 | 11.58156 | |
| TL2 —318 | −97.612 | 3 | SK4 |
| | 31.664 | 0 | |
| TL3 —322 | 31.664 | 2 | BAF51 |
| | −21.003 | 0.5 | |
| | − | 0 | |
| WINDOW —341 | Infinity | 1 | N−BK7 |
| | Infinity | 0 | |
| | − | 0 | |
| | Infinity | 11.00003 | |
| | − | 0 | |
| CHIP —340 | Infinity | 0 | MIRROR |
| | − | 0 | |

| Comment | Radius | Thickness | Glass |
|---|---|---|---|
|  | Infinity | 1000 |  |
|  | Infinity | −1000 |  |
|  | Infinity | 32 |  |
| COL1 ⎫ | −41.689 | 1.62 | LASFN9 |
| ⎬ 320 | −23.99 | 0.5000002 |  |
| COL2 ⎭ | Infinity | 3 | SF57 |
|  | −56.558 | 60 |  |
|  | − | 0 |  |
| FIELD GRATING—332 | Infinity | 0 | MIRROR |
|  | − | −48 |  |
| ML1—314 | −78.684 | −2 | SFL57 |
| ML2—312 | −14.286 | −5.34 | LAF2 |
|  | 14.582 | 0 |  |
| ML3—310 | 14.582 | −2 | LAKN14 |
|  | Infinity | −44.70471 |  |
|  | − | 0 |  |
| FOLD MIRROR—345 | Infinity | 0 | MIRROR |
|  | − | 72.41898 |  |
| TL1—316 | Infinity | 3 | LAKL12 |
|  | 17.937 | 11.58156 |  |
| TL2—318 | −97.612 | 3 | SK4 |
|  | 31.664 | 0 |  |
| TL3—322 | 31.664 | 2 | BAF51 |
|  | −21.003 | 0.5 |  |
|  | − | 0 |  |
| WINDOW—341 | Infinity | 1 | N-BK7 |
|  | Infinity | 0 |  |
|  | Infinity | 11.00003 |  |
|  | − | 0 |  |
| CHIP—340 | Infinity | 0 | MIRROR |
|  | − | 0 |  |
| SPACE | Infinity | −14.75693 |  |
| RT1—520 | −20.28031 | −3 | BK7 |
|  | 24.17101 | 0 |  |
| SPACE | Infinity | −41.61443 |  |
| RT2—530 | −19.50217 | −3 | BK7 |
|  | 26.07139 | 0 |  |
| SPACE | Infinity | −17.62874 |  |
| END MIRROR—540 | Infinity | 0 | MIRROR |
|  | Infinity |  |  |

FIG. 5C

TELECOMMUNICATIONS OPTICAL PROCESSOR

RELATED APPLICATIONS

This application claims priority under 35 U.S.C. §119(e) to U.S. Provisional Application No. 60/383,641, filed May 28, 2002, by Smith et al., titled "Telecommunications Optical Processor." Said application is incorporated by reference in its entirety.

STATEMENT OF GOVERNMENT RIGHTS

Aspects of this invention were made under Funds-In Agreement F1018010703 between Sandia National Laboratories, operating under its contract with the United States Department of Energy, and Polychromix, Inc. The government may have certain rights in the invention.

BACKGROUND OF THE INVENTION

An important consideration in the design of an optical processor for telecommunications applications is minimization of the processor's package size. For example, because optical processors are commonly installed in a conventional card-in-rack manner, the package thickness of a given processor may determine whether the processor will fit in a rack, and the package length and width will determine how much space the processor will take up on a card. However, while package size is a significant concern, any design must be made with consideration for optical performance (e.g., aberration correction and light throughput).

A particular type of telecommunications processor having a relatively large package size is a demultiplexer of optical carriers of a wavelength-division multiplexed (WDM) signal. Demultiplexers are commonly used as a part of more complex processors to achieve spatial separation between optical carriers so that the optical carriers can be processed individually. For example, demultiplexers may be used in gain equalization filters (GEFs) and in optical adding and dropping modules (OADMs).

One option for reducing the package size of a demultiplexer is to incorporate the demultiplexer into a fiber, such as by using a fiber Bragg grating (FBG). While fiber grating structures can achieve demultiplexing in a compact space, they exhibit performance limitations such as temperature sensitivity. Additionally, because the number of carriers that can be demultiplexed by an FBG is proportional to the length of the FBG, as the number of optical carriers included in conventional wavelength-division multiplexed signals increases, the size advantages provided by FBGs is being reduced.

Free-space optics provide an alternative to FBGs. Free-space demultiplexers typically include a diffraction grating to achieve spatial separation of optical carriers. The diffraction gratings angularly separate the optical carriers, such that the angle of emergence of the carriers from the grating is a function of wavelength. Following angular separation, the angularly separated optical carriers are propagated to allow the optical carriers to separate spatially. Accordingly, the package size of a free-space demultiplexer is at least partially determined by the spectral separation of the carriers to be demultiplexed and the amount of spatial separation to be achieved. The package size required to achieve adequate spatial separation provided by conventional free-space demultiplexers is becoming larger as the spectral separation between the optical carriers comprising WDM signals is becoming smaller.

Figure 1:
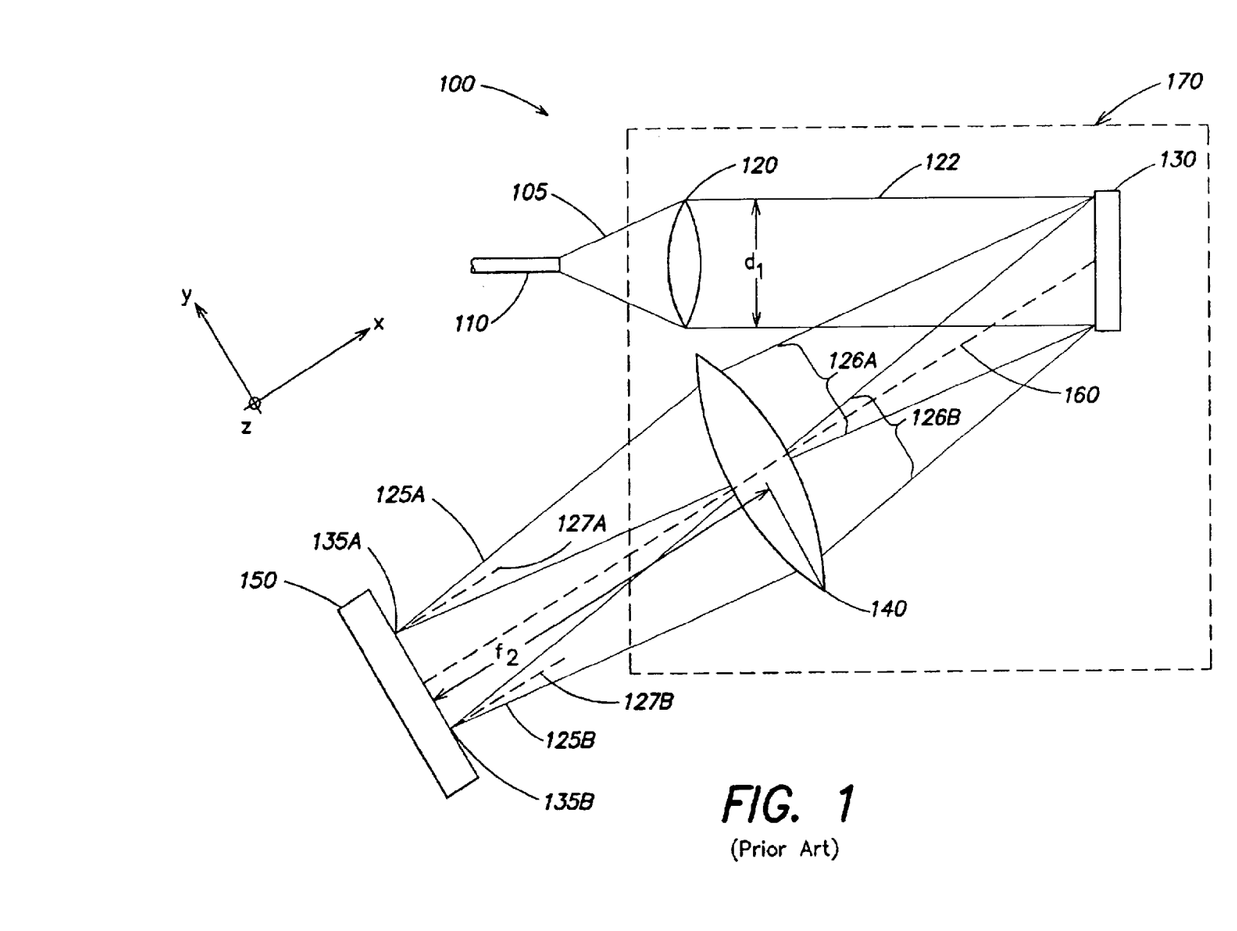
FIG. 1 is a schematic of a conventional optical processor illustrating concepts related to aspects of the present invention.

FIG. 1 is a schematic of a conventional optical processor 100 conducive to the reduction of package size. In FIG. 1, a fiber 110 provides a wavelength-division multiplexed signal 105 to a conventional demultiplexer 170, including a collimating lens 120, a grating 130, and a focusing lens 140 (having a focal length $f_2$). Demultiplexer 170 spatially separates the component optical carriers 125A and 125B of the WDM signal, and focuses the spatially-separated optical carriers onto a reflective optical modulator 150.

More specifically, the WDM signal is collimated by lens 120 to form a beam 122, the optical carriers comprising the WDM signal are angularly separated by grating 130, such that each separated optical carrier forms a collimated beam (e.g., beams 126A, 126B), and each such collimated beam propagates at an angle with respect to optical axis 160 of lens 140. Optical axis 160 extends in the direction of the x-axis.

Lens 140 is telecentricly located (i.e., lens 140 is located one focal length $f_2$ from both grating 130 and modulator 150), such that it focuses optical carriers 125A and 125B and projects each of them in a cone of light having a respective centerline 127A, 127B. Each centerline 127A, 127B is normal to a surface of a respective pixel 135A, 135B of modulator 150. Each optical carrier 125A, 125B is modulated by actuation of one or more operational components of the pixels 135A and 135B. The components of demultiplexer 170 (i.e., collimating lens 120 grating 130 and positive lens 140) are selected to achieve an amount of spatial separation between carriers 125A and 125B in the y-direction on modulator 150. Accordingly, the operative elements 135A and 135B can modulate individual optical carriers 125A and 125B.

Because lens 140 projects each optical carrier in a cone of light having a centerline 127A, 127B normal to a surface of reflective optical modulator 150, optical carriers 125A and 125B can be re-multiplexed by transmitting a reflected portion of the modulated optical carriers back through demultiplexer 170 in the reverse direction of the unmodulated carriers.

Although the processor of FIG. 1 provides a relatively compact package size compared to prior designs, the processor remains relatively large. That is, for a processor 100 to achieve adequate spatial separation of optical carriers 125A and 125B, the dimensions of optical processor 100 measured in the x-direction (i.e., package length) and in the y-direction (i.e., package width) remain relatively large. For example, a conventional optical processor may have a length of 200 mm, a width of 100 mm and a thickness of 20 mm. Accordingly, there remains a need to reduce the package size of multiplexer/demultiplexers.

SUMMARY OF THE INVENTION

The forgoing need is addressed herein by a demultiplexer comprising a combination of a first positive lens group, negative lens group, second positive lens group in order between a dispersive element (e.g., a diffraction grating) and a reflective element (e.g., a modulator). The demultiplexer is configured to achieve an amount of spatial separation between the optical carriers of an optical signal resulting from propagating the signal through the demultiplexer in a first direction. In some embodiments according to some aspects of the invention, optical carriers may be propagated through the demultiplexer in a second direction (i.e., a reverse direction of the first direction) to spatially re-combine the optical carriers into a multiplexed signal. As one of ordinary skill will understand, a given optical processor may function as a multiplexer or demultiplexer depending on the direction of propagation through the processor. Therefore, although a processor is described herein as a demultiplexer, it should be understood that the processor may also be used as a multiplexer.

The phrase "lens element" (or simply "lens") is defined herein to be a single lens. The phrase "lens group" is defined herein to be a set of one or more lens elements operating to perform a specified function (e.g., a positive lens group to converge light, a negative lens group to diverge light, a collimating lens group to collimate light). The phrase "lens system" is defined herein to be a set of one or more lens elements, forming one or more lens groups. A first optical device "optically coupled" to a second device is positioned to receive output light from the second device or to transmit output light to the second device.

A first aspect of the invention is directed to an optical processor for processing a WDM signal having a plurality of optical carriers comprising, in order: a dispersive optical element to separate the optical carriers; a first positive lens group optically coupled to the dispersive element; a negative lens group optically coupled to the first positive lens group; a second positive lens group optically coupled to the negative lens group; and a reflective surface optically coupled to the second positive lens group and aligned to direct at least a portion of one of the plurality of optical carriers back to the dispersive optical element.

In some embodiments, the optical processor further comprises a collimator, located prior to the dispersive element, adapted to collimate the WDM signal and project the WDM signal onto the dispersive optical element. In some embodiments, the first positive lens group is disposed in a location where the plurality of optical carriers are angularly separated but are not completely spatially separated.

Optionally, the reflective surface is disposed in a location where the plurality of optical carriers are focused on the reflective surface. Optionally, the plurality of optical carriers are projected normally onto the reflective surface. In some embodiments, the reflective surface is an operative surface of a mechanically actuatable diffractive device. The optical processor may be a dynamic channel equalizer.

Another aspect of the invention is directed to an optical processor for processing a signal having a plurality of optical carriers, comprising: a dispersive optical element to separate the plurality of optical carriers; a lens system optically coupled to the dispersive optical element and arranged to focus the plurality of optical carriers at a focal plane, the lens system having an effective focal length; and a reflective surface located at the focal plane, the distance between the dispersive element and the reflective surface being substantially less than two times the effective focal length.

In some embodiments, the reflective surface is the operative surface of a diffractive modulator arranged to direct at least one of the plurality of optical carriers back to the dispersive optical element. Optionally, the plurality of optical carriers are projected normally onto the reflective surface. The optical processor may be a dynamic channel equalizer.

In some embodiments, the optical processor further comprises a collimator positioned to collimate the signal and project the signal onto the dispersive optical element. In some embodiments, the lens system comprises, in order from the dispersive element, a first positive lens group, a negative lens group, and a second positive lens group. Optionally, the first positive lens group is disposed in a location where the plurality of optical carriers are angularly separated but are not completely spatially separated.

Yet another aspect of the invention is directed to a double-pass optical processor to process a plurality of optical carriers of a WDM signal, comprising: a dispersive optical element to angularly separate the plurality of optical carriers; a lens system optically coupled to the dispersive element to receive the plurality of optical carriers from the dispersive element; a modulator optically coupled to the lens system having a reflective surface with a normal, to process the plurality of optical carriers, and configured and arranged such that the plurality of optical carriers are projected onto the reflective surface by the optical system other than along the normal; and a reflector configured to receive the plurality of optical carriers from the modulator and to reflect the plurality of optical carrier back onto the reflective surface, whereby the plurality of optical carriers is processed by the modulator during both a first pass and a second pass onto the reflective surface.

Optionally, the reflective surface is configured and arranged such that the plurality of optical carriers are projected at a 45-degree angle to the normal of the reflective surface. In some embodiments, the lens system is comprised of, in order from the dispersive element, a first positive lens group, a negative lens group, and a second positive lens group. The modulator may be an electrostatically-actuatable, diffractive device.

In some embodiments, the reflector is comprised of a spherical reflective surface. The reflector may be comprised of a reflective surface having a plurality of planar, reflective elements, each reflective element being arranged to reflect a corresponding one of the plurality of optical carriers. The double-pass optical processor may further comprise a beam steering device having a first steering surface and a second steering surface, wherein the lens system has an optical axis and the reflective surface of the modulator is arranged to be parallel to the optical axis, and wherein the first steering surface is arranged to project the plurality of optical carriers onto the reflective surface at 45 degrees to the normal, and the second steering surface is arranged to form a 135 degree angle relative to the first steering surface and to project the plurality of optical carriers along the optical axis.

Still another aspect of the invention is directed to a method of processing a WDM signal having a plurality of optical carriers, comprising: spatially separating the plurality of optical carriers; applying a first positive power to the plurality of optical carriers using a first positive lens group; applying a negative power to the plurality of optical carriers; applying a second positive power to the plurality of optical carriers; and directing the at least one of the plurality of optical carriers back to the first positive lens group.

The method of processing may further comprise a step of collimating the signal prior to the step of spatially separating. In some embodiments, the step of applying a first positive power is performed on optical carriers that are angularly separated but are not completely spatially separated. In some embodiments, the method further comprises a step of modulating at least one of the optical carriers. In some embodiments, the method further comprises the step of focusing the optical carriers, such that the step of modulating the optical carriers is performed on the optical carrier when they are focused.

Optionally, the modulating step and the directing step are achieved by the surface of a reflective, diffractive modulator. In some embodiments, the method further comprises a step of directing the optical carriers normally onto the surface of the reflective, diffractive modulator. Optionally, the method of processing may further comprise a step of directing the optical carriers other than normally onto the surface of the reflective, diffractive modulator.

Still another aspect of the invention is directed to a method of processing a plurality of optical carriers of an optical signal, comprising: spatially separating the plurality of optical carriers; projecting the plurality of optical carriers onto a reflective optical modulator a first step of modulating and reflecting the plurality of optical carriers using the reflective optical modulator; reflecting the plurality of optical carriers back to the reflective optical modulator; and a second step of modulating and reflecting the plurality of optical carriers using; the reflective optical modulator, whereby the plurality of optical carriers are modulated twice by the reflective optical modulator.

In some embodiments, the method of processing further comprises collimating the signal prior to the step of spatially separating. Optionally, the step of projecting includes applying a first positive power to the plurality of optical carriers; applying a negative power to the plurality of optical carriers; and applying a second positive power to the plurality of optical carriers.

In some embodiments, the method further comprises a step of focusing the optical carriers, such that the first step of modulating and reflecting is performed on the optical carriers when they are focused. Optionally, the step of modulating and reflecting is achieved by a surface of a diffractive, reflective optical modulator. In some embodiments, the method further comprises a step of transmitting the carriers through a quarter-wave plate intermediate the first step of modulating and reflecting, and the step of reflecting the plurality of optical carriers back to the reflective optical modulator.

BRIEF DESCRIPTION OF THE DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE INVENTION

Referring again to FIG. 1, modulator 150 may be, for example a reflective, MEMS-based, diffractive modulator wherein the modulation is achieved by pixels (135A and 135B) having two or more grating elements (not shown). It should be understood that the lengths of the grating elements of a MEMs-based diffractive modulator may extend along the z-direction or the y-direction, depending on the orientation of grating 130.

In embodiments where modulator 150 is a diffractive modulator, optical carriers 125A, 125B are modulated and an undiffracted portion (commonly referred as the zeroth order) of the modulated optical carrier is projected back through demultiplexer 170. Accordingly, the optical carriers are recombined spatially (i.e., re-multiplexed) by grating 130 and coupled back into fiber 110. In the case of diffractive modulators, the amplitudes of carriers 125A and 125B are controlled by diffracting the optical carriers such that at least a portion of the optical carriers is diffracted out of the zeroth order and is not reflected back through processor 100 into fiber 110. Although the operational areas (i.e., pixels 135A, 135B) of a diffractive modulator are understood to be comprised of a plurality of grating elements which may not form a planar or continuous surface, the term "surface" is used herein to refer to an operational area of a diffractive modulator including a plurality of grating elements.

As mentioned above and described in greater detail below, for processor 100 to work effectively, the size of the area that each optical carrier illuminates on modulator 150 (i.e., the "spot size") is be selected, and the optical carriers are sufficiently spatially-separated from the other carriers, so that each carrier impinges on a distinct, pixel (e.g., 135A for carrier 125A, and pixel 135B for carrier 125B) of modulator 150. That is, there is suitable spatial resolution.

The following equations can be used to specify spot size and spatial separation on modulator 150 of processor 100. Diameter $s_2$ of the spots focused onto modulator 150 is given by:

$$s_2 = M s_1 \quad (1)$$

where $S_1$ is the mode diameter of the fiber core of fiber 110, and M is the magnification of optical processor 100. Magnification of optical processor 100 is given by the ratio of focal length $f_2$ of lens 140 and focal length $f_1$ of lens 120.

The center-to-center separation of the optical carriers is given by:

$$\Delta x = D f_2 \Delta \lambda \quad (2)$$

where, for example, D is the dispersion of the grating 130 in radians per nanometer, and $\Delta \lambda$ is the channel-to-channel spacing in nanometers of wavelength.

Assuming fiber 110 has a numerical aperture indicated by NA, and assuming lens 120, having a focal length $f_1$, is to receive and collimate signal 105, then the diameter $d_1$ of beam 122 is given approximately by the equation:

$$d_1 = 2 N A f_1 \quad (3)$$

One of ordinary skill would understand that if lens 120 is to transmit the entirety of the beam 105 from fiber 110, and lens 140 is to transmit the entirety of the spatially separated light from grating 130, then $d_1$ also determines the minimum diameter of lens 120 and, along with dispersion D, determines the minimum diameter of lens 140.

Aspects of the invention are built on a recognition that the above equations can be combined to form the following expression for the ratio of diameter $S_2$ to the separation of the optical carriers $\Delta x$, as measured on modulator 150:

$$s_2/\Delta x = 2s_1 NA/d_1 D\Delta\lambda \quad (4)$$

It should be noted that the ratio $s_2/\Delta x$ of Equation 4 is independent of the focal lengths of lenses 120 and 140.

The ratio of diameter $s_2$ to the pixel-to-pixel center distance $\Delta x$, as expressed in Equation 4, is a measure of the spatial resolution of the carriers at modulator 150. Alternatively stated, the ratio provides a measure of the amount of crosstalk (i.e., the degree to which optical carriers corresponding to adjacent carriers spatially overlap when projected onto modulator 150) of processor 100.

A processor 100 may be designed to have a selected value of the ratio $s_2/\Delta x$ based on factors including, for example, the width and pitch of the grating elements of MEMs-based, grating modulator 150, and the allowable amount of crosstalk as determined by a communication system receiving a signal from optical processor 100. For example, a typical value for the ratio $s_2/\Delta x$ is 0.5, where the spot size diameter $s_2$ is one-half of the value of the pixel-to-pixel center distance $\Delta x$.

Since $s_1$ and NA are fixed by the optical properties of fiber 110 from which processor 100 receives signal 105, Equation 4 expresses a tradeoff between grating dispersion D, spectral separation between carriers $\Delta\lambda$, and the beam diameter $d_1$ at first lens 120. Accordingly, Equation 4 indicates that to improve spatial resolution (i.e., to reduce the ratio $s_2/\Delta x$) for a given spectral separation $\Delta\lambda$, a grating 130 having a high dispersion D and/or a large beam diameter $d_1$ at first lens 120 are preferred.

Since the dispersion value D is limited by current methods of grating manufacture gratings and spectral separation between carriers $\Delta\lambda$ is ever decreasing to increase the amount of data that can be transferred by a system, to improve spatial resolution, beam diameter $d_1$ (and corresponding diameters of lens 120 and lens 140) are preferably increased to reduce the ratio $s_2/\Delta x$. However, if as stated above, NA is fixed by the optical properties of the fiber and $d_1$ is the beam diameter, then referring to Equations 1 and 3, it can be seen that an increase in the diameters of lens 120 and lens 140 mandates that lens 120 and lens 140 have large focal lengths $f_1$ and $f_2$. Consequently, in a conventional telecentric system (e.g., system 100), where lens 140 is located one focal length from each of grating 130 and modulator 150, reducing the ratio $s_2/\Delta x$ by increasing $f_2$ results in an increase in dimensions in both the x-direction (i.e., package length) and in the y-direction (i.e., package width). The phrase "focal length" is defined herein to be the effective focal length, where "effective focal length" is defined to mean the distance from a principal plane of an identified lens, lens group, or lens system to the image plane of the identified lens, lens group, or lens system.

Figure 2:
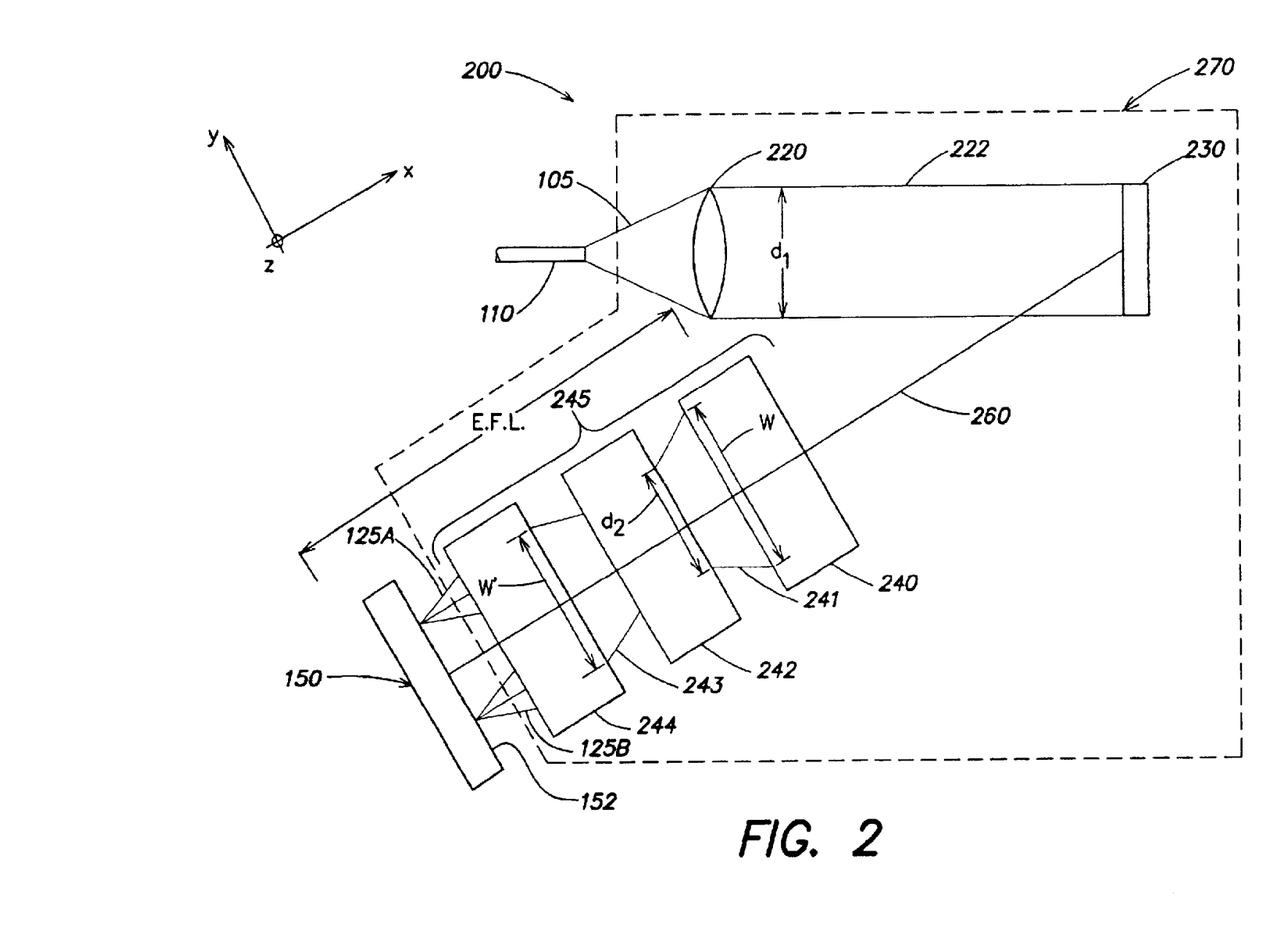
FIG. 2 is a functional block diagram of an exemplary embodiment of an optical processor illustrating aspects of the present invention.

FIG. 2 is a schematic diagram of an optical processor 200 illustrating aspects of the present invention. In FIG. 2, fiber 110 provides a WDM signal 105 to a demultiplexer 270 that includes a collimating lens group 220, a dispersive element 230 and a lens system 245. A "dispersive element" shall herein be defined as any element that separates radiation (e.g., spatially and/or angularly) into wavelength components.

Dispersive elements may separate radiation using refraction (e.g., a prism), diffraction (e.g., a diffraction grating) or any other known principle to achieve separation of wavelength components (e.g., the carriers of a WDM signal). Demultiplexer 270 spatially separates the component optical carriers 125A and 125B of the WDM signal, and focuses the spatially-separated optical carriers onto an at least partially reflective surface 152. For example, surface 152 may be a surface of a optical modulator 150 as described below. In some embodiments, reflective surface 152 may be partially transmissive (i.e., partially mirrored) such that a portion of one or more carriers is transmitted for measurement (e.g., power measurement) and the non-transmitted portion of the carriers is reflected back to fiber 110. Although the input to optical processor 200 is illustrated as a single fiber 110, as is known in the art, a second fiber (not shown) may be added such that one fiber is an input to demultiplexer 270 and the other is an output.

More specifically, WDM signal 105 is collimated by lens group 220 to form a collimated beam 222, and transmitted to dispersive element 230 and then to lens system 245. Processor 200 achieves a specified value of the ratio $s_2/\Delta x$ for a given diameter $d_1$ of beam 222, as described above.

Also as described above, to accommodate a beam diameter $d_1$, the diameters of lens group 220 and lens group 240 are made appropriately large and result in a correspondingly large effective focal length EFL of a lens system 245. However, aspects of the present invention accommodate a relatively large beam diameter $d_1$ (and provide a correspondingly low ratio $s_2/\Delta x$) while maintaining a small package size by reducing the distance between dispersive element 230 and modulator 150. The distance between dispersive element 230 and modulator 150 is understood to be measured along the optical axis 260 of lens system 245, and affects both package width and length.

A processor 200 having a low $s_2/\Delta x$ ratio and a relatively small package size is achieved by incorporating positive lens group 240 and negative lens group 242 into a lens system 245. According to aspects of the present invention, lens system 245 comprises positive lens group 240, negative lens group 242, and a positive lens group 244 in order between dispersive element 230 and optical modulator 150. Processor 200 employs a lens system 245 the elements of which can be dimensioned to allow dispersive element 230 and modulator 150 to be separated by a distance which could be, but need not be, less than twice the distance between a dispersive element 130 and modulator 150 in telecentric system (e.g., system 100 illustrated in FIG. 1) having the same effective focal length. As stated above, in a telecentric system, such as system 100, dispersive element 130 and modulator 150 are separated by twice the effective focal length of lens 140 (i.e., lens 140 is located a distance equal to one focal length from both dispersive element 130 and modulator 150).

Preferably the distance between dispersive element 230 and modulator 150 is substantially less than twice the distance between a dispersive element and modulator in a telecentric system having the same effective focal length. Substantially less means at least twenty percent less. In one embodiment discussed below, the distance between dispersive element 230 and modulator 150 is approximately fifty percent less the distance between a dispersive element and modulator in a telecentric system having the same effective focal length.

In processor 200, collimating lens group 220 transmits light to dispersive element 230. Positive lens group 240 provides positive optical power to light received from dispersive element 230 to converge (i.e., focus) the light and reduce the beam size received by negative lens group 242. Positive lens group 240 may be any suitable convergent (i.e., focusing) lens group configured and arranged to converge the individual carriers, and the entire beam width W. Positive lens group 240 need not be achromatic by itself; instead, the combination of positive lens group 240, negative lens group 242 and positive lens group 244 may be configured to be achromatic. Positive lens group 240 is located to operate on angularly separated carriers; however, at positive lens group 240, the carriers are spatially separated only to a relatively small degree. In some embodiments, it is advantageous to locate positive lens group 240 as close as possible to dispersive element 230, without optically or mechanically interfering with the remainder of the system, so as to maintain a relatively small package size.

Negative lens group 242 diverges the light of beam of light 241 to form a divergent beam of light 243. Negative lens group 242 is disposed in a location where the carriers are substantially spatially separated (i.e., to a higher degree than at the location of positive lens group 240), but typically are not totally spatially separated. Negative lens group 242 may be any suitable negative lens group capable of angularly diverging beam width W'. One of ordinary skill in the art will understand that because negative lens group 242 is disposed in a location where the carriers are substantially spatially separated, angularly diverging the beam width W' corresponds to spatially separating the carriers from one another. Although beam width W' is divergent, in some embodiments, after emerging from negative lens group 242, individual carriers remain convergent. Negative lens group 242 need not be achromatic by itself; instead, in most embodiments, as stated above, the combination of positive lens group 240, negative lens group 242 and positive lens group 244 is achromatic.

Positive lens group 244 receives divergent beam 243 and projects spatially-separated spots of light onto modulator 150. According to some aspects of the present invention, spatially-separated optical carriers 125A and 125B are projected normally to surface 152. Positive lens group 244 may be any suitable lens group capable of focusing the carriers onto a reflective surface 152 of modulator 150.

Optical designs according to the above aspects of the invention may provide benefits in any optical telecommunications applications where an input signal is demultiplexed and then measured or manipulated (e.g., modulated by modulator 150) and then remuliplexed. Embodiments of at least some aspects of the invention include, for example, multiplexer/demultiplexers, optical add/drop multiplexers, and dynamic gain equalizers, as well as optical switches and optical monitors.

Collimating lens group 220 may be any suitable collimating lens group. Preferably, lens group 220 is color-corrected over a spectrum covering each of the carriers of a WDM signal to be processed.

Modulator 150 may be any suitable modulator capable of effecting a change in the strength of the light impinging on modulator 150. Modulator 150 may effect a change in strength using any suitable technique. For example, the technique may be achieved by selectively attenuating the light throughput of the modulator by altering transmission of the modulator, absorption of the modulator or the diffractive qualities of the modulator. In one exemplary embodiment, modulator 150 is a mechanically actuatable, reflective, diffractive, modulator such as the electrostatic device described in copending U.S. patent application Ser. No. 10/090,381, titled METHODS AND APPARATUS FOR DIFFRACTIVE OPTICAL PROCESSING USING AN ACUATABLE STRUCTURE, filed Mar. 4, 2002 by Senturia, which is hereby incorporated by reference.

Reflective surface 152 may be the modulating (i.e., operative) surface as, for example, in the case of a reflective, diffractive modulator. However, the invention is not so limited. For example, in the case of a modulator having variable absorptive qualities, the reflective surface 152 may be located behind the modulating surface, such that carriers are modulated prior to and/or after reflection from surface 152.

Figure 3A:
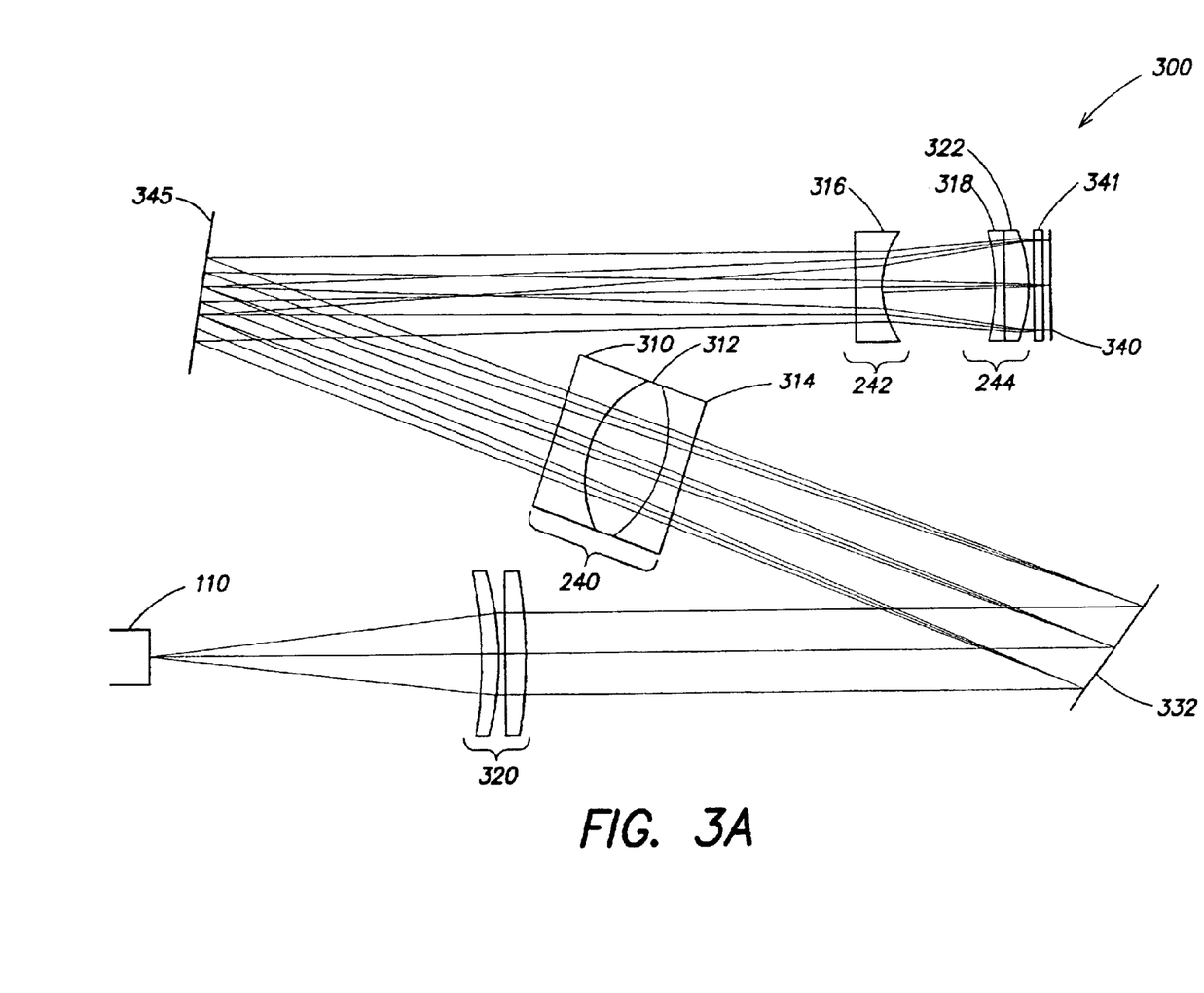
FIG. 3A is a schematic of an exemplary embodiment of an optical processor illustrating aspects of the present invention.

FIG. 3A is a schematic of one example of an embodiment of an optical processor 300 illustrating aspects of the present invention. Fiber 110 projects light into optical processor 300. In optical processor 300, the light is collimated by collimating lens group 320 and projected onto grating 332. Lens elements 310, 312, and 314 form first positive lens group 240, lens element 316 forms negative lens group 242, and lens elements 318 and 322 form positive lens group 244.

Figure 3B:
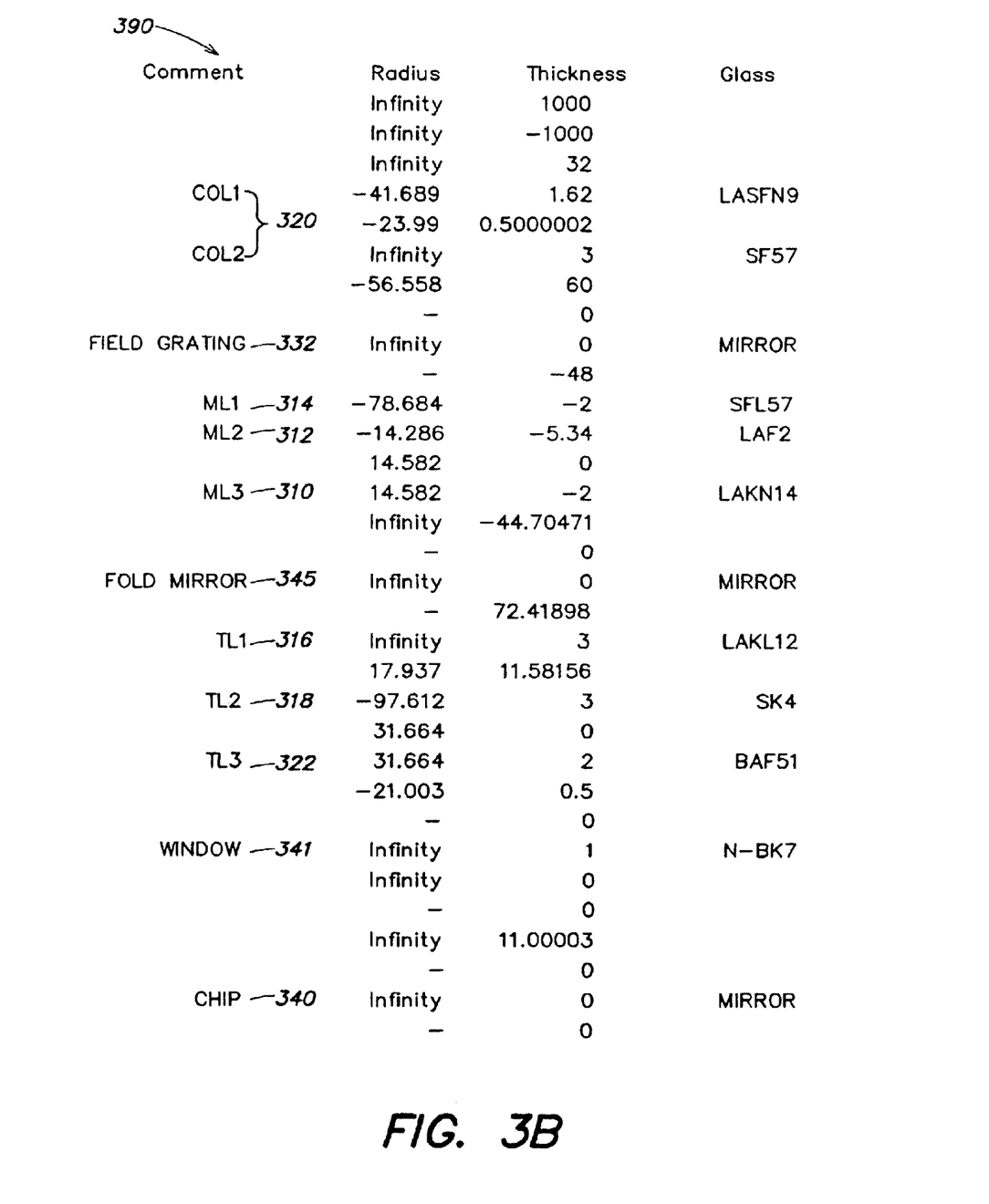
FIG. 3B is a table of lens data for the lens elements comprising one example of one embodiment of lens system of FIG. 3A.

FIG. 3B is a table 390 of lens data for the lens elements comprising one exemplary embodiment of lens system 300. The lens system described in FIG. 3B may function, for example, as a demultiplexer for a 40-channel dynamic channel equalizer with 100 GHz channel spacing using a 600 lines/mm dispersion grating. As one of ordinary skill will understand, one or more folding mirrors (e.g., folding mirror 345) may be included in system 300 to achieve a package having a selected shape. Also, optical modulator 340 may be covered by a window 341.

The exemplary embodiment provided in table 390 has an effective focal length (EFL in FIG. 2) of approximately 208 mm and the distance between grating 332 and modulator 150 of approximately 202 mm; by contrast, a lens system according to the prior art (e.g., telecentric lens system of FIG. 1), having an effective focal length of 208 mm would have a distance between grating 130 (in FIG. 1) and modulator 150 of approximately 416 mm. Accordingly, the package size of optical processor employing the above lens system would be substantially smaller for a given EFL and a given amount of spatial separation of optical carriers of a WDM signal.

Figure 4A:
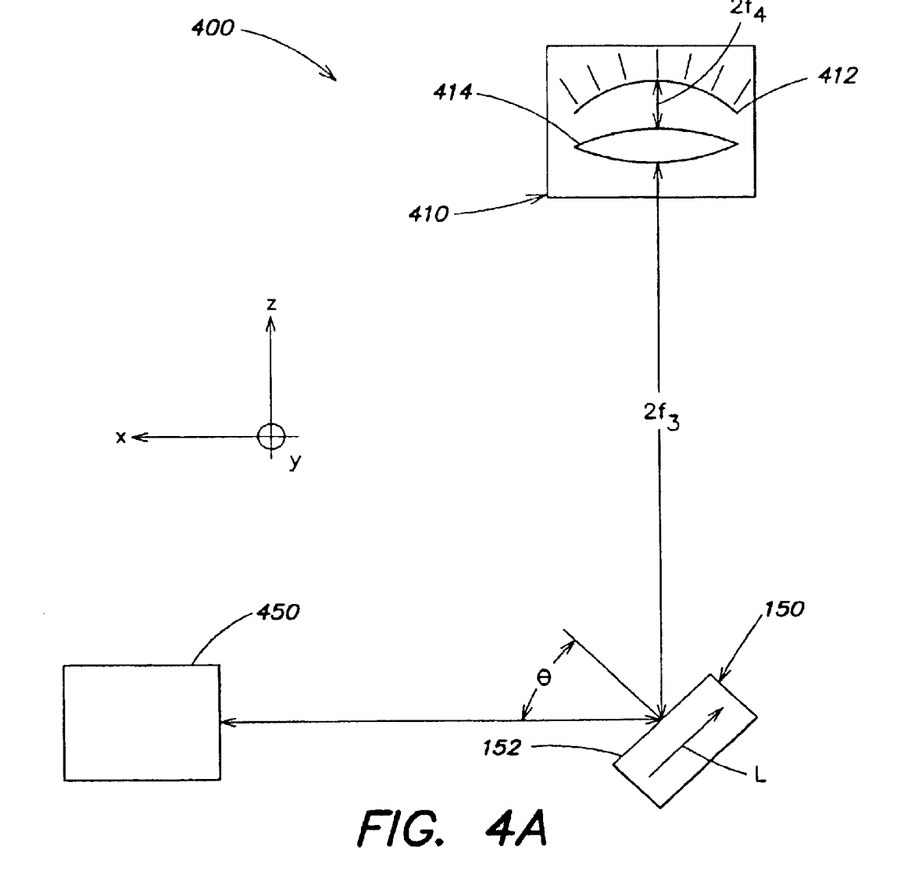
FIG. 4A is a schematic of an exemplary embodiment of a double-pass optical processor illustrating another aspect of the present invention.

FIG. 4A is a schematic of an optical processor 400 illustrating another aspect of the present invention. FIG. 4A illustrates a double-pass processor providing improved dynamic range of attenuation for each channel of an optical processor 400. In processor 400, light is projected onto modulator 150 during a first pass and a second pass. During the first pass, light is incident on modulator 150 from demultiplexer 450, and during the second pass light is incident on modulator 150 from reflector 410. Modulator 150 can be a diffractive modulator, interference modulator or any other modulator providing suitable modulation.

Embodiments according to this aspect of the invention have an optical modulator 150 oriented so that during a first pass, light (i.e., optical carriers) from a demultiplexer 450 (e.g., lenses 120, and 140 and grating 130 of FIG. 1; or lens 220 and lens system 245 and dispersive element 230 of FIG. 2) impinges on modulator 150 other than normally to the surface of the modulator 150, and includes reflector 410 to receive light from modulator 150 and to reflect the light back to modulator 150 during a second pass.

Figure 4B:
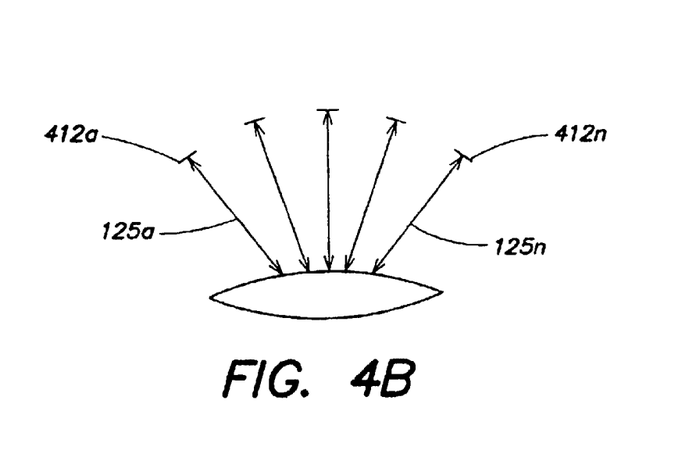
FIG. 4B is an expanded view of an exemplary embodiment of a pixelated reflector for use in a double-pass optical processor according to some aspects of the invention.

Preferably, light projected onto modulator 150 during each of the first and the second pass is substantially focused on the modulator 150. In some embodiments, modulator 150 is located at the focal plane of a demultiplexer, and the light reflected from modulator 150 during the first pass has a large f-number; in such embodiments, reflective optics 410 may be formed of a spherical lens 414 and a spherical mirror 412 aligned to return light along the same path as the light incident on reflective optics 410. For example, lens 414 may be located a distance equal to twice its focal length $f_3$ from modulator 150, and mirror 412 may be located a distance twice its focal length $f_4$ from lens 414. Mirror 412 is selected to have a curvature capable of reflecting the light from carriers 215a–215n along the same path along which they are incident on mirror 412 or, in some embodiments, as illustrated in FIG. 4B, can be appropriately pixilated so that individual pixels 412a–412n (i.e., flat segments) of mirror 412 reflects the light from corresponding carriers 125a–125n along the same path as the light incident.

In one embodiment, the light is initially projected onto modulator 150 at an angle Θ equal to 45 degrees relative to the normal of the surface of the operative surface 152 of modulator 150, such that the light is reflected vertically out of the plane of the optical design in FIG. 2 (i.e., the light is reflected in the direction of the z-axis). The light's direction of travel is then reversed by reflective optics 410 as described above.

It is to be appreciated that in embodiments of system 400 where modulator 150 is a MEMS-based diffractive modulator, the lengths of the grating elements extend in direction L, parallel to the surface of modulator 150.

As described above, in some embodiments of the invention, optical modulator 150 is a MEMS-based diffractive modulator. One of ordinary skill will understand that in such a processor, attenuation is achieved by appropriately positioning the grating elements of the MEMS device to cause incident light to diffract away from the main pathway of the light. Further details regarding attenuation of light using a MEMS diffractive grating are given in copending application entitled, Methods and Apparatus for Diffrctive Optical Processing using an Actuatable Structure, incorporated by reference herein above.

As one of ordinary skill will understand, for a diffraction grating positioned at an angle Θ equal to zero, if the adjacent grating elements are coplanar or are separated by a distance equal to a multiple of one-half of the wavelength of the light incident on the adjacent grating elements, the grating acts as a mirror (i.e., the grating has substantially zero attenuation). However, if adjacent grating elements are separated by a distance equal to an odd multiple of one-quarter of the wavelength of the light incident, the light is diffracted away from the main pathway of the incident light (i.e., the light is substantially fully attenuated).

In a system such as system 400 where the MEMS diffraction grating is oriented at an angle Θ relative to the beam projected onto the diffraction grating, the relative positioning of adjacent gratings elements to achieve a given level of attenuation is at least partially determined by angle Θ. In such a system, the separation distance of adjacent grating elements to achieve a given level of attenuation is increased by a factor of 1/cos Θ. Accordingly, at an angle Θ equal to 45 degrees, the adjacent actuatable grating elements must be separated by a distance 1.414 times greater than the separation necessary to achieve the same level of attenuation of light incident for a system where Θ equals 0 degrees (i.e., where carriers 125A and 125B are incident normal to the surface of modulator 150 as illustrated in FIG. 2).

Figure 5A:
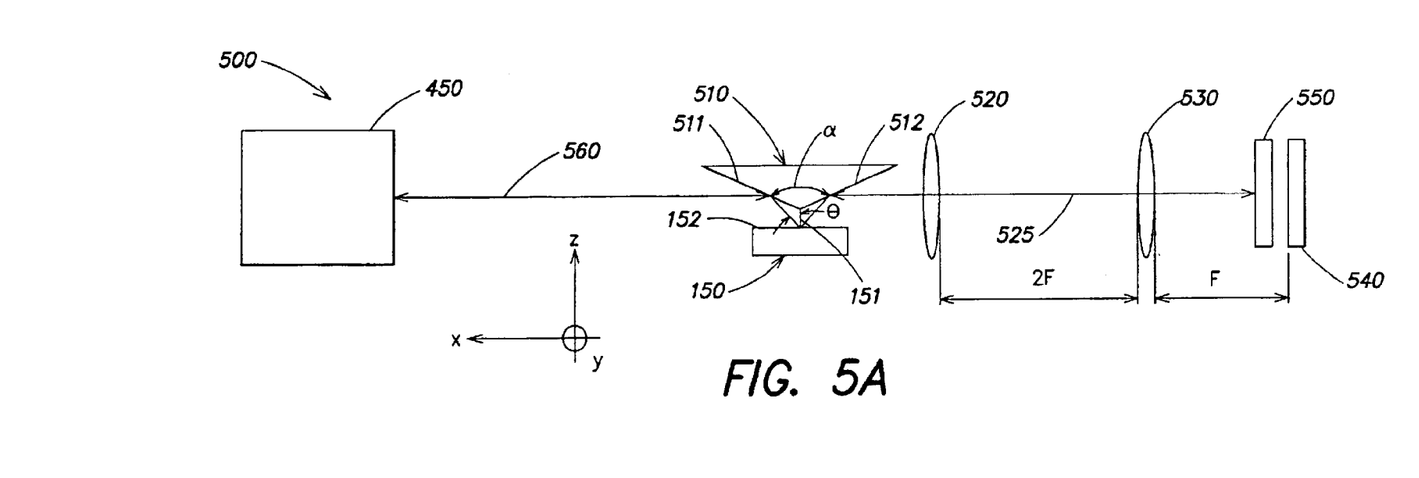
FIG. 5A is another embodiment of a double-pass optical processor according to aspects of the present invention.

FIG. 5A illustrates an alternative embodiment of a double-pass optical processor 500 according to aspects of the present invention. By locating modulator 150 with its operative surface 152 facing in the direction of the z-axis (i.e., the operative surface is parallel the optical axis 160), and locating a prism 510 (or another suitable beam steering device) to project light onto the operative surface of modulator 150, the package size of optical processor 500 is smaller as measured in the z-direction (i.e., the package is less thick), when compared to optical processor 400 of FIG. 4A. Surfaces 511, 512 of prism 510 may be coated with gold or any other appropriate reflective coating to steer a beam to and from modulator 150.

Figure 5B:
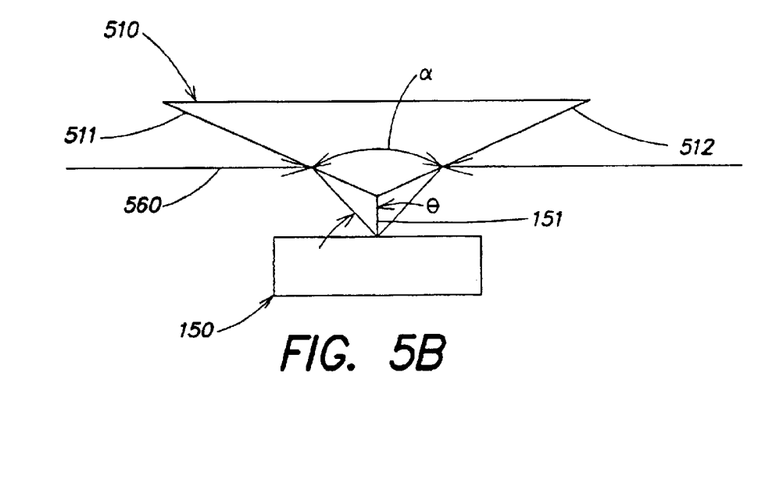
FIG. 5B is an expanded view of the beam-steering device and modulator of FIG. 5A.

In some embodiments of processor 500, prism 510 may have an apex angle α equal to about 135°. Accordingly, carriers traveling along axis 560 impinge on modulator 150 at an angle Θ equal to about 45° with a normal 151 to the operative surface 152. FIG. 5B is an expanded view of prism 510 and modulator 150, illustrating surfaces 511, 512 of prism 510 (also referred to herein as steering surfaces), and apex angle α. As described above, carriers traveling along optical axis 560 impinge on a surface of modulator at an angle Θ equal to about 45°.

Figure 5C:
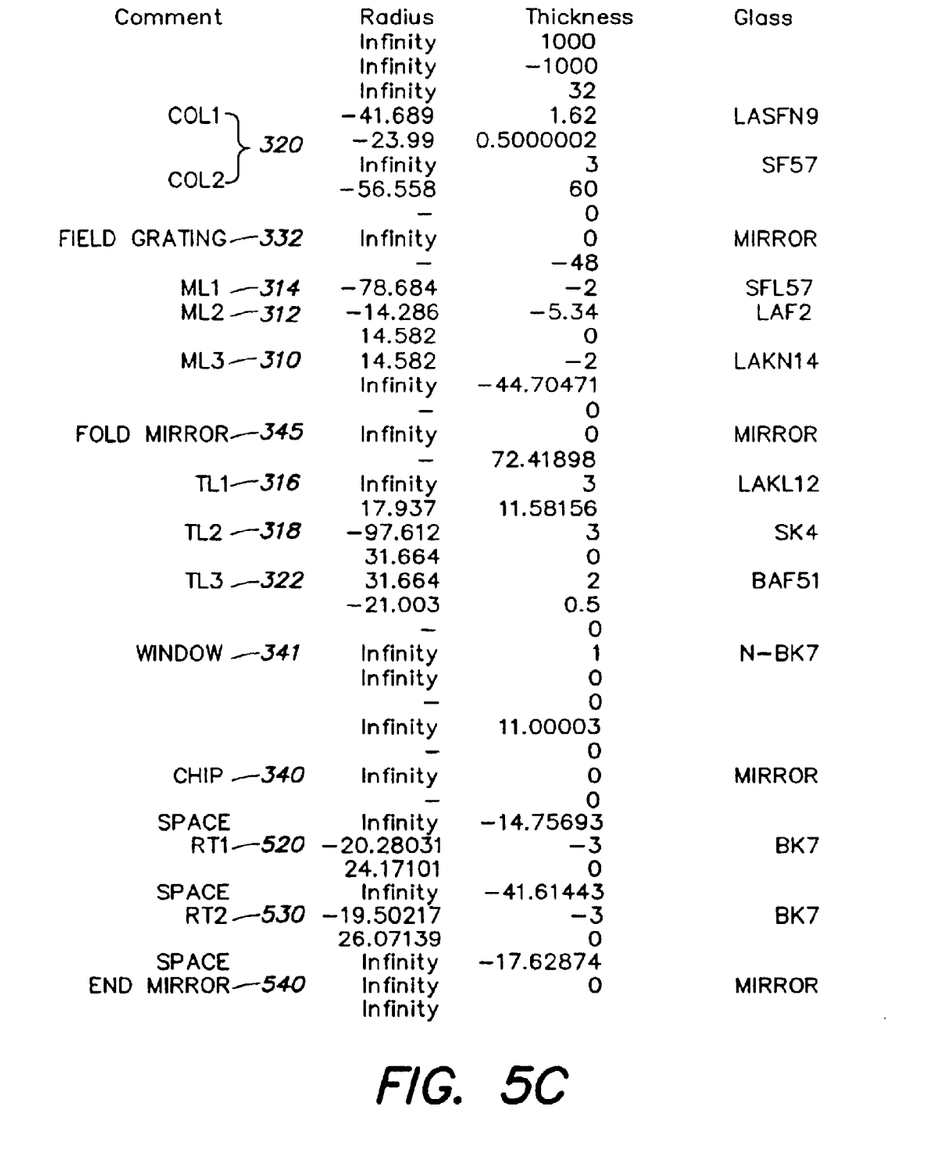
FIG. 5C is a table of lens data for the lens elements comprising one example of one embodiment of lens system of FIG. 5A.

Referring again to FIG. 5A, lenses 520 and 530 are located on an optical axis 525, and each has a focal length F (e.g., 20 mm). Lenses 520 and 530 are separated by a distance equal to the sum of the focal lengths of lenses 520 and 530 (i.e., 2F). Lens 530 is located at a distance equal to focal length F from the mirror 540, and lens 520 is located a focal length F from modulator 150, as measured along the optical path. Accordingly, if optical carriers received from multiplexer 450 are projected in the direction of the x-axis and are focused on optical modulator 150, the optical carriers will be projected in a direction normal to mirror 540 such that the light is reflected along the same path as the light incident on mirror 540 and is reflected by prism 510 and refocused on modulator 150. FIG. 5C is a table of lens data for the lens elements comprising an exemplary embodiment of lens system 500.

One concern for two-pass systems (e.g., system 400 of FIG. 4, and system 500 of FIG. 5) is stray light. The phrase "stray light" includes light diffracted away from the main pathway by modulator 150. Preferably the optics of a two-pass system are arranged so that the light diffracted away from the main pathway on the first pass is not directed back into the main pathway during the second pass. An evaluation of the illustrated design performed using ZEMAX optical design software (produced by Focus Software Inc. of Tucson, Ariz.) indicates that the stray light does not re-enter the main pathway for the system of Table 2. An evaluation also indicates that double-pass system 500 provides improved attenuation characteristics (i.e., the attenuation is approximately double what can be achieved by a single-pass optical system.)

Optionally, a quarter-wave plate 550 may be added to system 500 to rotate the polarization of the optical beam by 90°. Accordingly, the light passes through system 500 once with a first polarization and once with a second polarization normal to the first polarization, thus making the attenuation of system 500 independent of polarization.

Having thus described the inventive concepts and a number of exemplary embodiments, it will be apparent to those skilled in the art that the invention may be implemented in various ways, and that modifications and improvements will readily occur to such persons. Thus, the examples given are not intended to be limiting. The invention is limited only as required by the following claims and equivalents thereto. Also, it is to be understood that the use of the terms "including," "comprising," or "having" is meant to encompass the items listed thereafter and equivalents thereof as well as additional items before, after, or in-between the items listed.

What is claimed is:

1. A double-pass optical processor to process a plurality of optical carriers of a WDM signal, comprising:
   a dispersive optical element to angularly separate the plurality of optical carriers;
   a lens system optically coupled to the dispersive element to receive the plurality of optical carriers from the dispersive element;

a modulator optically coupled to the lens system having a reflective surface with a normal, to process the plurality of optical carriers, and configured and arranged such that the plurality of optical carriers are projected onto the reflective surface by the lens system other than along the normal; and a reflector configured to receive the plurality of optical carriers from the modulator and to reflect the plurality of optical carrier back onto the reflective surface, whereby the processor is configured such that the plurality of optical carriers are is processed by the modulator during both a first pass and a second pass onto the reflective surface.

2. The double-pass optical processor of claim 1, wherein the reflective surface is configured and arranged such that the plurality of optical carriers are projected at a 45-degree angle to the normal of the reflective surface.

3. The double-pass optical processor of claim 1, wherein the lens system is comprised of, in order from the dispersive element, a first positive lens group, a negative lens group, and a second positive lens group.

4. The double-pass optical processor of claim 1, wherein the modulator is electrostatically-actuatable, diffractive device.

5. The double-pass optical processor of claim 1, wherein the reflector is comprised of a spherical reflective surface.

6. The double-pass optical processor of claim 1, wherein the reflector is comprised of a plurality of planar, reflective elements, each reflective element being arranged to reflect a corresponding at least one of the plurality of optical carriers.

7. The double-pass optical processor of claim 1, further comprising a beam steering device having a first steering surface and a second steering surface, wherein the lens system has an optical axis and the reflective surface of the modulator is arranged to be parallel to the optical axis, and wherein the first steering surface is arranged to project the plurality of optical carriers onto the reflective surface at 45 degrees to the normal, and the second steering surface is arranged to form a 135-degree angle relative to the first steering surface and to project the plurality of optical carriers along the optical axis.

8. A method of processing a plurality of optical carriers of an optical signal, comprising:

spatially separating the plurality of optical carriers;

projecting the plurality of optical carriers onto a reflective optical modulator a first step of modulating and reflecting the plurality of optical carriers using the reflective optical modulator;

reflecting the plurality of optical carriers back to the reflective optical modulator; and a second step of modulating and reflecting the plurality of optical carriers using, the reflective optical modulator, whereby the plurality of optical carriers are modulated twice by the reflective optical modulator.

9. The method of processing in claim 8, further comprising collimating the signal prior to the step of spatially separating.

10. The method of processing in claim 8, wherein the step of projecting includes applying a first positive power to the plurality of optical carriers, applying a negative power to the plurality of optical carriers, and applying a second positive power to the plurality of optical carriers.

11. The method of processing in claim 8, further comprising a step of focusing the optical carriers, such that the first step of modulating and reflecting is performed on the optical carriers when they are focused.

12. The method of processing in claim 11, wherein the step of modulating and reflecting is achieved by a surface of a diffractive, reflective optical modulator.

13. The method of processing in claim 8, further comprising a step of transmitting the carriers through a quarter-wave plate intermediate the first step of modulating and reflecting, and the step of reflecting the plurality of optical carriers back to the reflective optical modulator.

14. The double-pass optical processor of claim 1, further comprising a quarter-wave plate disposed intermediate the modulator and the reflector.

\* \* \* \* \*

UNITED STATES PATENT AND TRADEMARK OFFICE
CERTIFICATE OF CORRECTION

PATENT NO. : 6,985,308 B1  Page 1 of 1
DATED : January 10, 2006
INVENTOR(S) : Smith et al.

It is certified that error appears in the above-identified patent and that said Letters Patent is hereby corrected as shown below:

<u>Title page,</u>
Item [74], *Attorney, Agent, or Firm*, should read -- Lowrie, Lando & Anastasi, LLP --.

<u>Column 13,</u>
Line 11, delete "is".

<u>Column 14,</u>
Line 13, delete "," after "using".

Signed and Sealed this

Second Day of May, 2006

JON W. DUDAS
*Director of the United States Patent and Trademark Office*